Nov. 14, 1950      A. BIERY      2,529,589
MOUSETRAP
Filed Nov. 28, 1949
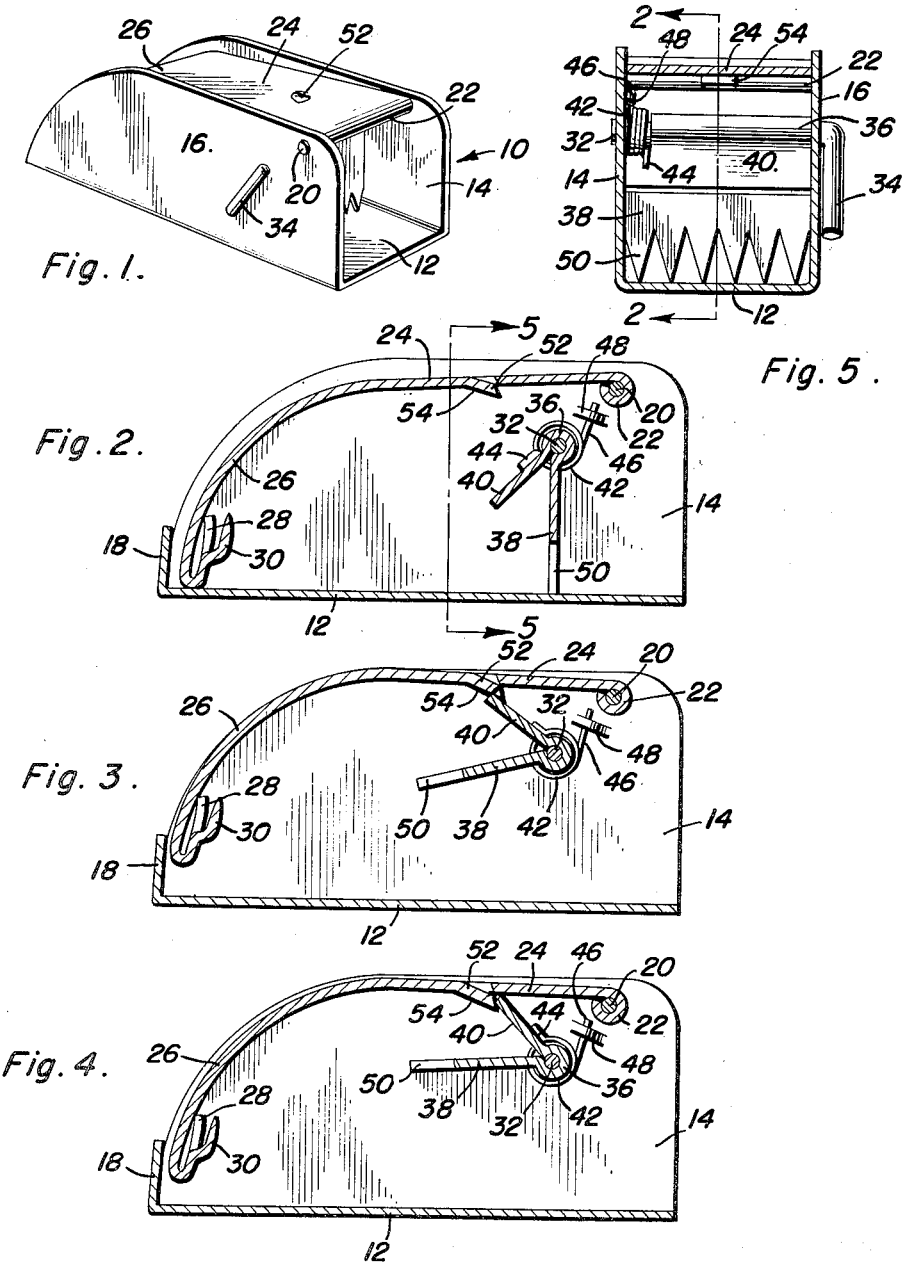
Arthur Biery
INVENTOR.

Patented Nov. 14, 1950

2,529,589

UNITED STATES PATENT OFFICE 2,529,589

MOUSETRAP

Arthur Biery, Pine Island, Minn.

Application November 28, 1949, Serial No. 129,852

4 Claims. (Cl. 43—61)

This invention relates to new and useful improvements in animal traps and the primary object of the present invention is to provide a mouse trap including a closure and a swingable upper wall for retaining the closure open until the upper wall is engaged by an animal whereupon the closure will be released and urged to its closed position.

Another very important object of the present invention is to provide a mouse trap including a pressure release closure holding member having a bait support integrally formed therewith.

A further object of the present invention is to provide a mouse trap including a swingable closure, and a swingable upper wall that is engaged with the closure to hold the closure in its open position as the closure is manually raised against the upper wall.

A still further aim of the present invention is to provide a mouse trap that is simple and practical in construction, strong and reliable in use, small and compact in structure, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a perspective view of the present invention and showing the closure in its closed position;

Figure 2 is a longitudinal vertical sectional view of the present invention, taken substantially on the plane of section line 2—2 of Figure 5, and showing the closure in its closed position;

Figure 3 is a view similar to Figure 2 and showing the closure being raised and just about to be engaged by the upper wall;

Figure 4 is a view similar to Figure 2 and showing the closure engaged and held raised by the upper wall; and Figure 5 is a transverse vertical sectional view taken substantially on the plane of section line 5—5 of Figure 2.

Referring now to the drawings in detail, wherein for the purpose of illustration, there is disclosed a preferred embodiment of the present invention, the numeral 10 represents an elongated substantially channel shaped member including a base or web portion 12 and a pair of upstanding side walls 14 and 16. The rear end of the base 12 is turned upwardly to provide a stop flange or abutment 18.

The upper forward corners of the side walls 14 and 16 are apertured to receive the ends of a pivot pin 20. A sleeve 22 at the forward end of an upper wall or actuating member 24 embraces the pin 20 and the rear curved end portion 26 of the upper wall 24 is bent upon itself to provide an inturned flange 28. Bait holding teeth 30 are struck from the flange 28.

The stop flange 18 will engage the rear end portion 26 and thereby limit the raising of the rear end portion to restrict the escape of animals trapped within the member 10.

The side walls 14 and 16 are provided with additional openings, below and rearwardly of the openings for the pivot pin 20, that receive another pivot pin 32. One end of the pin 32 extends well outwardly from the member 10 and is bent to provide a finger grip 34 whereby the pin 32 may be conveniently rotated.

The sleeve portion 36 of a closure 38 receives and is pressed against the pin 32 so that the closure may be raised as the pin 32 is rotated by the finger grip 34. A tongue 40 extends from the sleeve portion 36 and is disposed at an acute angle with the closure 38.

One end of the sleeve portion 36 is notched so that one end of the pin 32 can accommodate a coil spring 42. One end 44 of the spring 42 bears against the rear face of the closure 38 whereas the other end 46 of the spring is received by an eye 48 struck from the side wall 14 in order to yieldingly urge the toothed edge 50 of the closure 38 downwardly and forwardly against the base 12.

A lip 52 is struck from the forward portion of the upper wall 24 and will bear against the tongue 40 in order to hold the closure in an open position as shown in Figure 4.

In practical use of the present invention, the closure 38 is swung upwardly and rearwardly by a manual rotation of the pin 32. As the rear face of the tongue or extension rides against the cam surface 54 of the lip 52 (see Figure 3), the rear end of the wall 24 will be raised with the closure until the extension 40 rides past the cam surface 54 whereupon the forward surface of the extension 40 will be urged against the lip 52 by the spring 42 to retain the closure raised (see Figure 1).

When the closure is raised, the rear end portion 26 of the upper wall 24 is still spaced from the flange 18, so that an animal biting the bait applied to the teeth 30 will raise the rear end end 26 and thereby cause the lip 52 to release the tongue 40 and the closure will be quickly urged to its closed position.

The closure cannot be moved pivotally upwardly and forwardly from its position shown in Figure 2 since the teeth 50 will bind against the base 12; therefor the trapped animal cannot escape until the closure is raised by the grip 34.

An outstanding feature of the present invention is that at no time does the operator have to touch the mouse or any part of the trap where the mouse has been caught to either set the trap or to unload and re-set the trap.

Another feature is that of safety since no child can get its fingers caught in the trap in any manner.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is suceptible to certain changes fully comprehended by the spirit of the invention as herein described and the scope of the appended claims.

Having described the invention, what is claimed as new is:

1. An animal trap comprising a base having a pair of upstanding side walls, an elongated upper wall having a forward portion pivoted to said side walls and a rear portion movable toward and away from the base, a closure pivoted to the side walls adjacent and beneath the forward portion of said upper wall, means yieldingly urging the closure to a closed position against the base, and tripping means between the closure and the upper wall for retaining the closure open and the rear portion of the upper wall spaced from the base until the upper wall is raised by an animal contacting the same.

2. The combination of claim 1 and a bait support at the rear portion of said upper wall.

3. The combination of claim 1 wherein said tripping means includes a tongue on said closure, and a lip on said upper wall for engaging said tongue.

4. The combination of claim 3 wherein said lip includes a cam surface for receiving said tongue and effecting a lifting of the rear portion of said upper wall during swinging of said closure toward said upper wall.

ARTHUR BIERY.

No references cited.